Oct. 14, 1952        T. R. GOTTSTEIN        2,613,982

BATTERY LIFTER

Filed Dec. 22, 1947

INVENTOR.

Theodore R. Gottstein

BY

Thiess, Olson, & Mecklenburger

ATTY'S

Patented Oct. 14, 1952

2,613,982

UNITED STATES PATENT OFFICE 2,613,982

BATTERY LIFTER

Theodore R. Gottstein, Chicago, Ill.

Application December 22, 1947, Serial No. 793,077

17 Claims. (Cl. 294—92)

This invention relates to gripping and lifting devices and more particularly to a gripping jaw device for lifting and carrying storage batteries and the like.

This application is a continuation as to common subject matter claimed herein of my co-pending application Serial No. 610,608, filed August 13, 1945.

Various battery carriers have heretofore been proposed which grip the battery terminal posts in such a way as to cause a bending force to be exerted on the posts which frequently break off after several lifts of the battery by the carrier. Also, often it becomes somewhat awkward to get a secure hold on the posts with the carrier so as to insure safe carriage of the battery. Also, a frequent jar or bump of the battery while lifting or carrying will cause the carrier to slip off the post. Thus it is an object of this invention to provide a battery carrier which will insure a positive gripping action at all times while the battery is being hoisted and carried.

It is a further object of this invention to provide a battery carrier which will enable the operator to more quickly and positively grip the terminal posts of a battery.

A still further object of this invention is to provide a battery carrier which will minimize the bending force exerted on the terminal posts when the battery is being carried.

A still further object of this invention is to provide a battery carrier which is simple in design, safe and effective in operation, and inexpensive to produce.

Further and additional objects will appear from the description, accompanying drawings, and appended claims.

In accordance with one embodiment of this invention a battery carrier is provided having a handle with a rigid and inflexible center section and flexible, downwardly extending, nonconducting ends, and a pair of gripping jaw elements attached to each of the respective ends of said handle. Each of the jaw elements has an opening therethrough for receiving and gripping the battery terminal posts. The openings for each pair of jaw elements are in registration and the jaw elements are pivotally connected to swing about a common diameter of said openings. The non-gripping ends of the jaw elements extend outwardly and upwardly from the connection forming lever arm extensions and are connected to the flexible ends of the handle by leaf spring connecting members. The lever arm extensions are biased by the leaf spring members or some other suitable means to a gripping position and afford a positive gripping action once the post has been received in the openings.

For a more complete understanding of this invention reference should now be had to the drawings, wherein Fig. 1 is a side elevational view of the battery carrier showing one of the gripping members engaging one of the terminal posts of the battery and the other gripping member about to engage the other terminal post;

Figure 1:
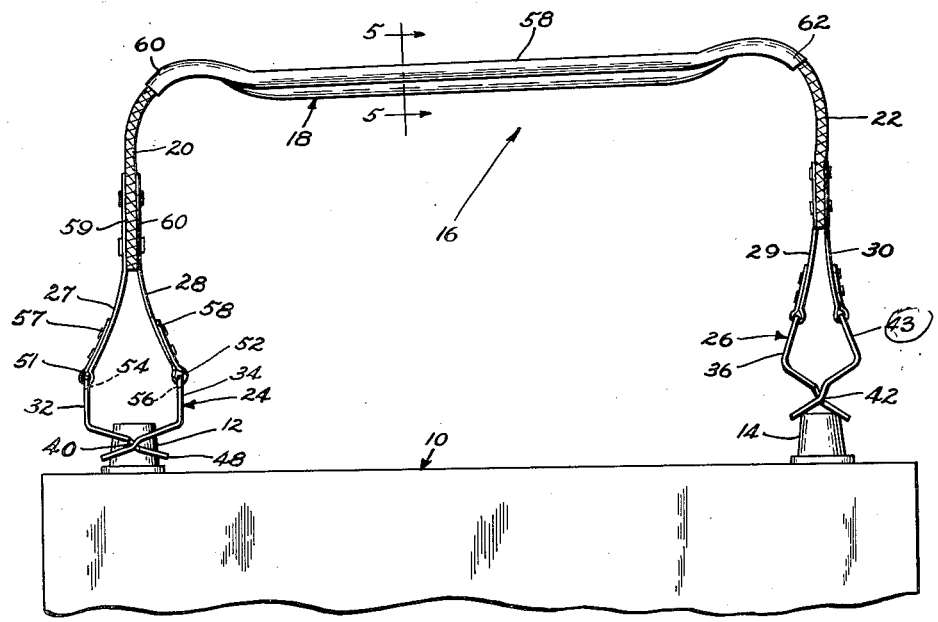
Figure 2:
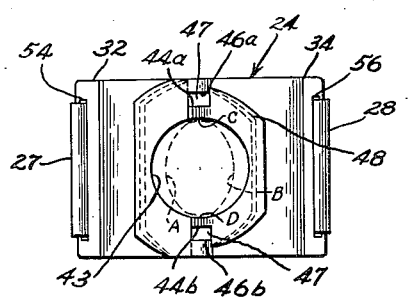
Fig. 2 is a bottom view of one of the gripping members shown in a spread position for receiving the battery terminal post; the normal gripping position of the members is shown in dotted lines.
Figure 3:
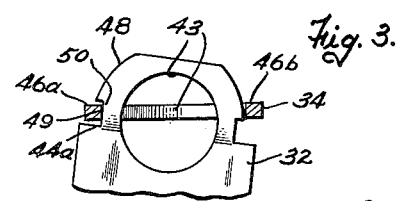
Fig. 3 is a fragmentary view of the pivotal connection for the gripping jaw elements with a portion of one of the gripping jaw elements removed so as to clearly show how the two elements are initially assembled.

Referring now to the drawings, a conventional type battery 10, as shown in Fig. 1, is provided having a pair of terminal posts 12 and 14 extending upwardly therefrom and a battery carrier 16 adapted to engage said terminal posts 12 and 14 when lifting and carrying said battery. The battery carrier 16 comprises a handle 18 having flexible ends 20 and 22, a pair of gripping members 24 and 26, and leaf spring connecting members 27, 28, 29, and 30 for connecting the gripping members 24 and 26 to the flexible ends 20 and 22 respectively of handle 18. Each of the gripping members 24 and 26 comprises a pair of substantially rigid and inflexible jaw elements 32 and 34, 36 and 38, which are pivotally connected at point 40 and 42. The elements are preferably of a sheet metallic material. Each element is of a modified L-shape, as shown in Fig. 1, and has at its gripping end an opening 43. The openings for each pair of elements are in registration when the levers are assembled. The elements 32 and 34, and 36 and 38, are pivotally connected, as noted above, at points 40 and 42 so as to swing about a common diameter of the openings. As the jaw elements assume a gripping relation with respect to a terminal post 14, the distance between diametrically opposed points A and B on the edges of the openings 43, see Fig. 2, is shortened thereby causing only a small portion of the edges, adjacent points A and B, to engage and bite into the peripheral surface of the post. Points C and D on the edges of the openings, which form the common diameter about which the jaw elements 32 and 34 swing, remain in a relatively fixed position with respect to each other regardless of whether the jaw elements are in or out of gripping relation. Thus the portions of the edges, adjacent points C and D, are spaced from the peripheral surface of the post, when the jaw elements assume a gripping relation.

Inasmuch as both gripping members 24 and 26 are of the same construction, I shall describe only member 24. As shown in Fig. 2 the left hand element 32 has a pair of diametrically opposite notches 44a and 44b which engage with a pair of diametrically opposite slots 46a and 46b cut in the right hand element 34. Enough clearance 47 is left between notches 44a and 44b and slots 46a and 46b to allow the two elements to be readily assembled. The two elements may be initially assembled by inserting the curved end 48 of element 32 into the opening 43 and slots 46a and 46b of element 34, placing the edge 49 of slot 46a against the edge 50 of notch 44a and swinging the elements relative to each other to bring notches 44a and 44b and slots 46a and 46b into alignment. From pivotal connection 40 the jaw elements 32 and 34, extend outwardly in a lateral direction and then upwardly as shown in Fig. 1. Slots 54 and 56 are provided in the nongripping ends 51 and 52, respectively, of jaw elements 32 and 34. Leaf spring connecting members 27 and 28 are hingedly connected to elements 32 and 34, respectively, and extend through the corresponding slots 54 and 56. As shown in Fig. 1 the ends 57 and 58 of the connectng members 27 and 28 which were inserted through slots 54 and 56 respectively are looped back and riveted to the shank section of the leaf spring members 27 and 28. The upper ends 59 and 60 of spring members 27 and 28 are riveted to the downwardly protruding end 20 of handle 18. The spring members 27 and 28 cause the nongripping ends 51 and 52 of elements 32 and 34 respectively to be biased together in a gripping position so that the edges of the openings bite into the outer surface of the post 12 as shown in Fig. 1. The same arrangement and connection of the jaw elements is followed for gripping member 26.

Figure 4:
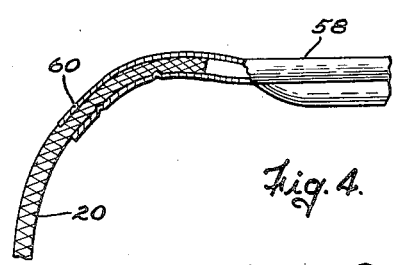
Fig. 4 is a fragmentary side elevational view of the center section and one of the flexible ends of the handle showing a portion of the center section removed.
Figure 5:
Fig. 5 is a sectional view of the center section of the handle taken along line 5—5 as shown in Fig. 1.

Handle 18 has a substantially rigid and inflexible center section 58 preferably of metalic material shaped in a bowed manner as shown in Fig. 5 so as to provide greater rigidity to the handle when lifting the battery. The length of the handle is substantially the same as the space between terminal posts 12 and 14. From the ends 60 and 62 of the center section 58 extend flexible nonconducting straps 20 and 22. The straps 20 and 22 are securely attached to the center sections 58 by having the ends 60 and 62 pinched together slightly as shown in Fig. 4. To the free ends of the flexible strap 20 and 22 are fastened leaf spring connecting members 27 and 28 and 29 and 30 which have been previously described.

Figures 6, 7:
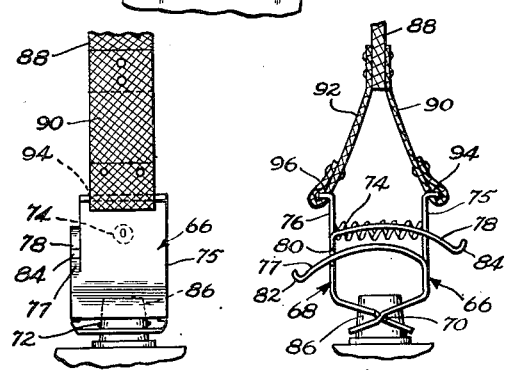
Fig. 6 is a fragmentary side elevational view of the modified gripping member shown in Fig. 7.
Fig. 7 is a fragmentary front view of a modified form of gripping member.

A modified form of gripping member is shown in Figs. 6 and 7 and comprises a pair of substantially rigid jaw elements 66 and 68 pivotally connected at point 70, as shown in Fig. 7, in the same manner as above described for member 24, and provided with an opening 72 at its gripping end. A coil spring 74 replaces the leaf spring connecting members 27 and 28 of the above described gripping member, and likewise causes the nongripping end portions 75 and 76 of jaw elements 66 and 68 to be biased together in a gripping position. Means have been provided in the modified form for releasing the gripping member from its gripping position, said means comprising a pair of struck out fingers 77 and 78 which are curved inwardly towards each other and extending beyond the adjacent jaw element. The finger 78 is arranged slightly above finger 77, as shown in Fig. 7. A slot 80 is provided in jaw element 68 so as to enable finger 77 to extend beyond said element. By grasping the ends 82 and 84 of the fingers 77 and 78 and squeezing them together the end portions 75 and 76 are caused to be spread apart and thereby causing the biting edges of the registered openings 72 of elements 66 and 68 to become disengaged from the terminal posts 86. Elements 66 and 68 are connected to the flexible end 88 of the handle (not shown) by means of a pair of flexible connecting straps 90 and 92. The connecting straps 90 and 92 extend through slots 94 and 96 cut in the nongripping ends of arms 75 and 76 respectively and then are folded back and riveted to straps 90 and 92, respectively, as shown in Fig. 7. The upper portions of the connecting straps are riveted to end 88.

Thus it will be seen that a battery carrier has been provided which will enable the operator to readily engage the terminal posts of the battery to be lifted and to insure that the said battery carrier has securely gripped said post regardless of the conditions of the terminal posts. Further safety is afforded the operator by the biasing effect on the jaw elements, because, if the battery is jarred or bumped while being carried, the jaw elements will continue to bite the outer surface of the post. Also the bending effect on the terminal posts, when the battery is being carried, is reduced to a minimum by the length of the handle causing a vertical lifting force to be exerted on the posts.

While several embodiments of this invention are shown above, it will be understood, of course, that the invention is not to be limited thereto since many modifications may be made, and it is contemplated, therefore, by the appended claims, to cover such modifications as fall within the true spirit and scope of this invention.

I claim:

1. A device for use in gripping a stud-like member comprising a pair of cooperating inflexible gripping jaw elements, each of said elements having an opening formed therein to receive said stud-like member, said openings being in registration and said jaw elements being pivotally connected together to swing about a common diameter of said openings as an axis whereby the edges of both openings engage and grip said stud-like member when said elements are in cooperative relation, said elements extending laterally a substantial distance in opposite directions from said axis to provide arm extensions, and spring means operatively connected to said elements for biasing said arm extensions toward each other to effect gripping of said stud-like member by the edges of said openings.

2. A device for use in gripping a stud-like member, comprising a pair of cooperating gripping jaw elements, each of said elements having an opening formed therein to receive said stud-like member, said openings being in registration and said jaw elements being pivotally connected together to swing about a common diameter of said openings as an axis whereby the edges of said openings being substantially rigid and inflexible engage and grip said stud-like member when said elements are in cooperative relation, said elements extendng laterally a substantal distance in opposite directions and upwardly from said axis to provide arm extensions and spring means operatively connected to said extensions for biasing the same toward each other to effect gripping of said stud-like member by the edges of said openings.

3. A device of the class described comprising a pair of gripping members having substantially rigid and inflexible, pivoted, jaw elements adapted at their lower end for gripping a battery post and having their nongripping ends extending outwardly and upwardly from said pivotal connection, spring means for biasing said nongripping ends together and means for releasing said jaw elements from a gripping position, said means comprising a pair of struck out fingers from said nongripping ends curved inwardly towards each other and extending beyond an adjacent jaw element.

4. A device for use in gripping a stud-like member comprising a pair of cooperating gripping jaw elements biased to a gripping position, each of said elements provided with an opening to receive said stud-like member, said openings being in registration and said jaw elements being pivotally connected together to swing about a common diameter of said openings as an axis whereby the edges of both openings engage and grip said stud-like member, said jaw elements being formed of inflexible sheet material lying in general planes transverse to the axis of the openings.

5. A device of the class described, comprising a pair of gripping jaw elements biased to a gripping position, each having an opening therethrough to receive a grippable device, said openings being in registration and said jaw elements being pivotally connected together to swing about a common diameter of said openings, the edges of said openings being substantially rigid and inflexible and engaging and gripping said grippable device, said jaws extending laterally a substantial distance in opposite direction from said pivotal connection and then upwardly to provide lever arm extensions for said jaws and means for releasing said jaw elements from a gripping position, said means comprising a struck out finger from each of said lever arm extensions, curved inwardly towards each other and extending beyond the adjacent arm extension.

6. A device of the class described, comprising a pair of gripping jaw elements biased to a gripping position, each having an opening therethrough to receive a grippable device, said openings being in registration and said jaw elements being pivotally connected together to swing about a common diameter of said openings, the edges of said openings being substantially rigid and inflexible and engaging and gripping said grippable device, said jaws extending laterally a substantial distance in opposite directions from said pivotal connection and then upwardly to provide lever arm extensions for said jaws and means for releasing said jaw elements from a gripping position, said means comprising a pair of hand engageable members mounted on said extensions respectively and each member extending beyond the adjacent extension.

7. A device of the class described comprising a pair of gripping jaw elements biased to a gripping position, each having an opening therethrough to receive a battery post, said openings being in registration and said jaw elements being pivotally connected together to swing about a common diameter of said openings, the edges of both openings engaging and gripping said post, said jaws being of sheet material lying in general planes transverse to the axis of the openings, one of said openings having a pair of oppositely disposed laterally extending notches therein to receive the opposite side edges of the other jaw to provide fulcrum means for the jaw elements.

8. A battery carrying device comprising a rigid handle having flexible ends, a pair of resilient biasing elements mounted on each of said flexible ends, and one of a pair of gripping members connected to each one of the members of each pair of said resilient biasing elements; each pair of said gripping members comprising a pair of substantially rigid and inflexible jaw elements pivotally connected to one another intermediate their ends and having one of their corresponding ends extending in one direction from said pivotal connection and embraceably gripping a battery post and their other coresponding ends extending outwardly in a second direction from said pivotal connection and being operatively connected to and biased toward each other by said resilient biasing elements.

9. A device for use in gripping a stud-like member comprising a handle and a pair of gripping members suspended from said handle; each of said gripping members comprising a pair of cooperating substantially rigid and inflexible jaw elements, each of said elements provided with an opening at one end thereof for receiving said stud-like member, said openings being in registration and said elements being pivotally connected together to swing about a common diameter of said openings as an axis when said elements are in cooperative relation, and spring means operatively connected to said cooperating elements for biasing the apertured ends of said jaw elements into gripping relationship with respect to said stud-like member.

10. A battery lifter comprising a pair of elongated gripping jaw elements, each of said elements having an opening formed in one end thereof to receive a battery post, said openings being in registration and said jaw elements being pivotally connected together to swing about a common diameter of said openings of constant length as an axis, the edges of both openings being substantially rigid and inflexible and engaging and gripping said post whereby the length of said common diameter remains substantially constant in the swinging operation and whereby substantial portions of the edges of said openings will be spaced from said post in gripping position, said jaw elements extending laterally a substantial distance in opposite directions from said axis to provide lever arm extensions whereby said post will be gripped mainly between diametrically opposed portions of the edges of the openings.

11. A device for use in gripping a stud-like member comprising a pair of elongated inflexible gripping jaw elements, each of said elements having an opening formed therein to receive said stud-like member, said openings being in registration and said jaw elements being pivotally connected together to swing about a common diameter of said openings of constant length as an axis, the edges of both openings being adapted to engage and grip said stud-like member whereby the length of said common diameter remains substantially constant in the swinging operation and whereby substantial portions of the edges of said openings will be spaced from said stud-like member in gripping position, said jaw elements extending laterally a substantial distance in opposite directions from said axis to provide lever arm extensions whereby said stud-like member will be gripped mainly between diametrically opposed portions of the edges of the openings.

12. A battery lifter comprising a pair of elongated gripping jaw elements, each of said elements having an opening formed in one end thereof to receive a battery post, said openings being in registration and said jaw elements being pivotally connected together to swing about a common diameter of said openings of constant length as an axis, the edges of both openings being substantially rigid and inflexible and engaging and gripping said post whereby the length of said common diameter remains substantially constant in swinging operation and whereby substantial portions of the edges of said openings will be spaced from said post in gripping position, said jaw elements extending laterally a substantial distance in opposite directions from said axis to provide lever arm extensions, and a flexible lifting band connected to said lever arm extensions whereby said post will be gripped mainly between diametrically opposed portions of the edges of the openings.

13. A gripping and pulling device comprising a pair of gripping jaw elements, each having an opening therethrough to receive a grippable device, said openings being in registration and said jaw elements being pivotally connected together to swing about a common diameter of said openings, the edges of both openings being substantially rigid and inflexible and engaging and gripping said grippable device whereby said grippable device will be gripped mainly between diametrically opposed portions of the edges of the openings, each jaw element having a handle element extending therefrom designed to be gripped and forced toward each other.

14. A device for use in gripping a stud-like member comprising a pair of elongated, inflexible gripping jaw elements, each of said elements having an opening formed therein to receive said stud-like member, said openings being in registration and said jaw elements being pivotally connected together to swing about a common diameter of said openings as an axis, the edges of both openings being adapted to engage and grip said stud-like member, said jaw elements being of sheet material lying in general planes transverse to the axis of the openings.

15. A gripping and pulling device comprising a pair of gripping jaw elements, each having an opening therethrough to receive a battery post, said openings being in registration and said jaw elements being pivotally connected together to swing about a common diameter of said openings, the edges of both openings engaging and gripping said post, said jaws being of sheet material lying in general planes transverse to the axis of the openings, one of said openings having a pair of oppositely disposed laterally extending notches therein to receive the opposite side edges of the other jaw to provide fulcrum means for the jaw members.

16. A battery lifting device comprising a pair of elongated inflexible gripping jaw elements each of said elements provided with an opening formed in one end thereof adapted to receive a battery post, said openings being in registration and said elements being pivotally connected together to swing about a common diameter of said openings, the edges of said openings being adapted to engage and grip said post, said elements extending laterally and transversely from said pivotal connection to form lever arm extensions, a spring operatively connected to said lever arm extension to effect biasing of said jaw elements whereby the edges of said opening grip said post, and means operatively connected to said arm extensions to release said jaw elements from said gripping relation.

17. A battery lifter comprising a pair of elongated gripping jaw elements, each of said elements having an opening formed therein to receive a battery post, said openings being in registration and said jaw elements being pivotally connected together to swing about a common diameter of said opening as an axis, the edges of both openings being substantially rigid and inflexible and engaging and gripping said post whereby the length of said common diameter remains substantially constant in swinging operation and whereby the major portions of the edges of said openings will be spaced from said post in gripping position, said jaw elements extending laterally a substantial distance in opposite directions from said axis to provide lever arm extensions whereby said post will be gripped mainly between diametrically opposed portions of the edges of the openings.

THEODORE R. GOTTSTEIN.

REFERENCES CITED

The following references are of record in the file of this patent:

UNITED STATES PATENTS

| Number | Name | Date |
| --- | --- | --- |
| 296,666 | Bowden | Apr. 8, 1884 |
| 1,422,765 | Johnson | July 11, 1922 |
| 1,893,971 | Terrell | Jan. 10, 1933 |
| 1,935,828 | Baldwin | Nov. 21, 1933 |
| 2,044,656 | Wright | June 16, 1936 |